US011944909B2

(12) United States Patent
Nomura (10) Patent No.: US 11,944,909 B2
(45) Date of Patent: Apr. 2, 2024

(54) INFORMATION PROCESSING DEVICE, INFORMATION PROCESSING SYSTEM, AND APPLICATION SCREEN IMAGE DISPLAYING METHOD (71) Applicant: Sony Interactive Entertainment Inc., Tokyo (JP)

(72) Inventor: Masanori Nomura, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 116 days.

(21) Appl. No.: 17/439,000

(22) PCT Filed: Mar. 26, 2020

(86) PCT No.: PCT/JP2020/013744
§ 371 (c)(1),
(2) Date: Sep. 14, 2021

(87) PCT Pub. No.: WO2020/203668
PCT Pub. Date: Oct. 8, 2020

(65) Prior Publication Data
US 2022/0152514 A1 May 19, 2022

(30) Foreign Application Priority Data
Apr. 3, 2019 (JP) ................. 2019-071582

(51) Int. Cl.
A63F 13/843 (2014.01)
A63F 13/35 (2014.01)
A63F 13/52 (2014.01)
(52) U.S. Cl.
CPC .......... A63F 13/843 (2014.09); A63F 13/35 (2014.09); A63F 13/52 (2014.09)

(58) Field of Classification Search
None
See application file for complete search history.

(56) References Cited

U.S. PATENT DOCUMENTS 7,559,834 B1    7/2009  York
8,435,121 B1 *  5/2013  Fisher ............... A63F 13/355
                                          463/31
(Continued)

FOREIGN PATENT DOCUMENTS

JP    2012181704 A    9/2012
JP    2013226276 A   11/2013
(Continued)

OTHER PUBLICATIONS

Notification for Reason for Refusal for corresponding JP Application No. JP 2019-071582, 13 pages, dated Oct. 21. 2022.
(Continued)

Primary Examiner — Damon J Pierce
(74) Attorney, Agent, or Firm — Matthew B. Dernier, Esq.

(57) ABSTRACT

An application execution unit executes a first application on the basis of operation information of a first inputting device by a first user to generate image data of the first application. A communication processing unit transmits operation information of a second inputting device by a second user to an external information processing device. An acquisition unit acquires image data of a second application from the external information processing device, the operation information of the second inputting device being reflected on the image data of the second application. A display processing unit displays a screen image of the first application and a screen image of the second application on a display device.

8 Claims, 7 Drawing Sheets (56) References Cited

U.S. PATENT DOCUMENTS

| | | |
|---|---|---|
| 8,830,244 B2 | 9/2014 | Kanemaru |
| 9,433,860 B2 | 9/2016 | Shikata |
| 9,682,323 B2 | 6/2017 | Imai |
| 9,908,044 B2 | 3/2018 | Takaichi |
| 2010/0267448 A1* | 10/2010 | Snoddy ............... A63F 13/2145 463/36 |
| 2012/0223952 A1 | 9/2012 | Kanemaru |
| 2013/0288789 A1 | 10/2013 | Shikata |
| 2014/0349753 A1 | 11/2014 | Imai |
| 2016/0151707 A1 | 6/2016 | Takaichi |
| 2019/0070500 A1 | 3/2019 | Kim |

FOREIGN PATENT DOCUMENTS

| | | |
|---|---|---|
| JP | 2015036033 A | 2/2015 |
| JP | 2016137250 A | 8/2016 |
| JP | 2018007833 A | 1/2018 |
| JP | 2019048043 A | 3/2019 |
| WO | 2013111247 A1 | 8/2013 |

OTHER PUBLICATIONS

International Search Report for corresponding PCT Application No. PCT/JP2020/013744, 5 pages, dated Jun. 16, 2020.

* cited by examiner

INFORMATION PROCESSING DEVICE, INFORMATION PROCESSING SYSTEM, AND APPLICATION SCREEN IMAGE DISPLAYING METHOD

TECHNICAL FIELD

The present invention relates to a technology for displaying a screen image of an application.

BACKGROUND ART

PTL 1 discloses, as a play mode, "online multi-play" in which a game is played by a plurality of users having a same game through connection to the Internet and "remote play" in which operation information of a game is transmitted to an information processing device at a remote place and game image data in which the operation information is reflected on the game progress is received from the information processing device.

CITATION LIST

Patent Literature

[PTL 1] PCT Patent Publication No. WO2013/111247

SUMMARY

Technical Problem

"Local multi-play" in a game is a play mode in which a plurality of players gathered at a same place operate individual game controllers to enjoy a cooperative play or a competitive play together on one game device. On the other hand, the "online multi-play" disclosed in PTL 1 is a play mode in which one player establishes connection of a game device to the Internet and performs a cooperative play or a competitive play together with another player or players on the Internet. Usually, since a game that incorporates an online multi-play mode is not compatible with a local multi-play, a plurality of players cannot play an online multi-play game on a single game device.

It is an object of the present invention to provide a technology for implementing such an environment that a plurality of players feel as if an application were being carried out together on one game device.

Solution to Problem

In order to solve the subject described above, according to a mode of the present invention, there is provided an information processing device including an application execution unit that executes a first application on the basis of operation information of a first inputting device by a first user to generate image data of the first application, a communication processing unit that transmits operation information of a second inputting device by a second user to another information processing device, an acquisition unit that acquires image data of a second application from the another information processing device, the operation information of the second inputting device being reflected on the image data of the second application, and a display processing unit that displays a screen image of the first application and a screen image of the second application on a display device.

According to another mode of the present invention, there is provided an information processing system including a first information processing device that executes a first application on the basis of operation information of a first inputting device by a first user, and a second information processing device that executes a second application on the basis of operation information of a second inputting device by a second user. The first information processing device displays a screen image of the first application in a first region of a display device and displays a screen image of the second application in a second region of the display device.

According to a further mode of the present invention, there is provided an application screen image displaying method including a step of executing a first application on the basis of operation information of a first inputting device by a first user to generate image data of the first application, a step of transmitting operation information of a second inputting device by a second user to an external information processing device, a step of acquiring image data of a second application from the external information processing device, the operation information of the second inputting device being reflected on the image data of the second application, and a step of displaying a screen image of the first application and a screen image of the second application on a display device.

It is to be noted that any combinations of the constituent elements described above and representations of the present invention obtained by conversion between a method, a device, a system, a recording medium, a computer program and so forth are also effective as modes of the present invention.

DESCRIPTION OF EMBODIMENT

Figure 1:
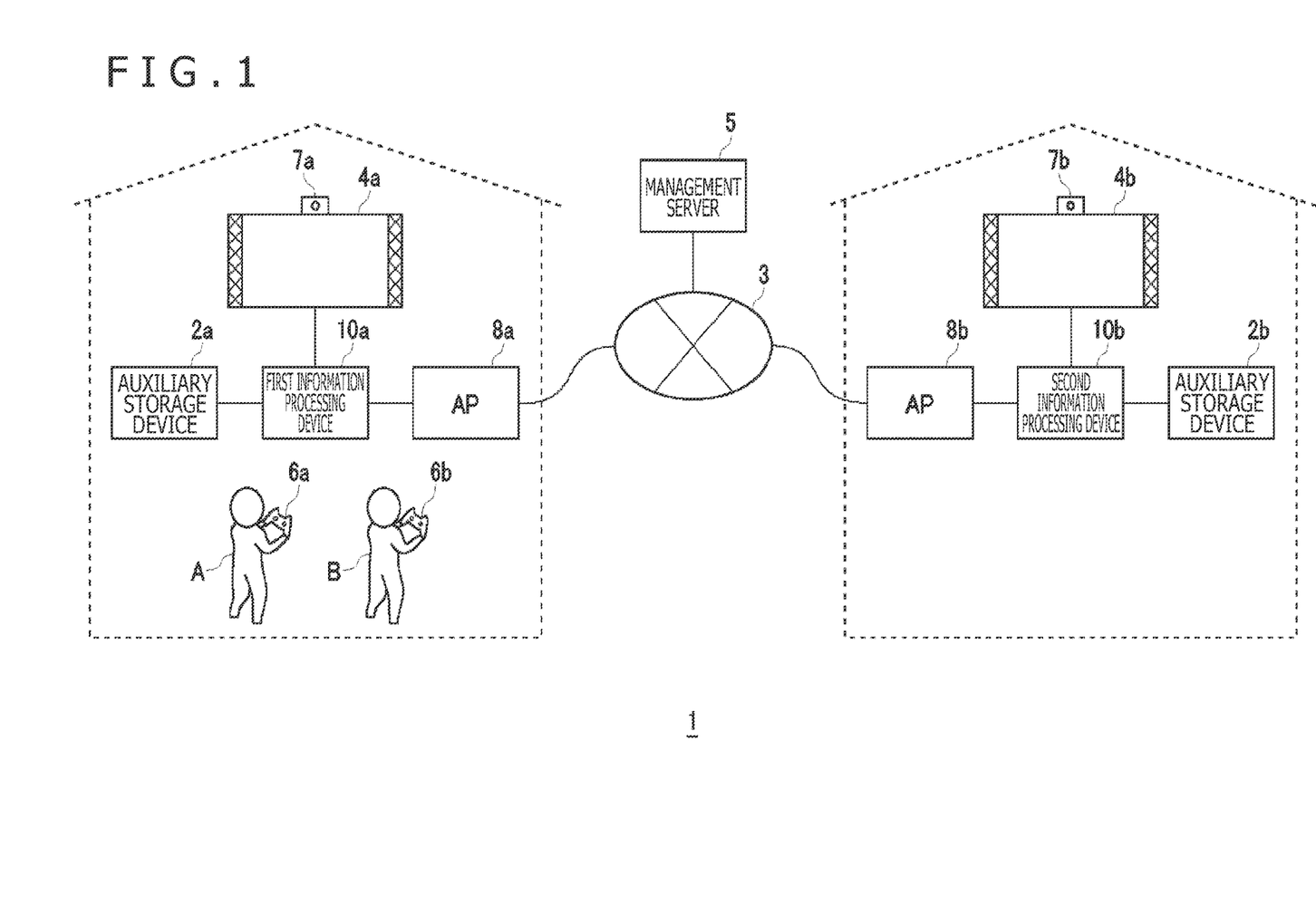
FIG. 1 is a view depicting a mode of an information processing system of an embodiment.

FIG. 1 depicts a mode of an information processing system of an embodiment. In the information processing system 1, a management server 5 provides a network service of games to users. The management server 5 manages network accounts for identifying users, and a user would use its network account to sign in to the network service provided by the management server 5. The user is enabled to carry out a "remote play" hereinafter described by signing in to the network service. In the remote play, a first information processing device 10a and a second information processing device 10b are connected to each other by P2P (Peer-to-Peer) communication.

The first information processing device 10a is installed in a home of a user A and is connected to an inputting device 6a operated by the user A and an inputting device 6b operated by a user B by wired or wireless connection. Each inputting device 6 provides operation information by an operation input of a user to the first information processing device 10a. The first information processing device 10a accepts the operation information from the inputting device 6 and reflects the operation information on processing of system software or application software, and causes an outputting device 4a to output a result of the processing. In the embodiment, the first information processing device 10a is a game device that executes a game, and the inputting devices 6a and 6b may be pieces of equipment that provide operation information of the users A and B to the first information processing device 10a such as a game controller.

An auxiliary storage device 2a is a large capacity storage device such as an HDD (Hard Disk Drive) or an SSD (Solid State Drive) and may be a build-in type storage device or may otherwise be an external storage device that is to be connected to the first information processing device 10a by the USB (Universal Serial Bus) or the like. The outputting device 4a may be a television set that includes a display that outputs an image and a speaker that outputs sound. The outputting device 4a may be connected to the first information processing device 10a by a wire cable or by wireless connection.

An access point (hereinafter referred to as "AP") 8a has functions of a wireless access point and a router, and the first information processing device 10a establishes connection to the AP 8a by wireless or wired connection to establish connection to an external network. A camera 7a is a stereo camera and captures an image of a space around the outputting device 4a.

The second information processing device 10b is installed in a home of the user B. The second information processing device 10b is connected to an auxiliary storage device 2b, an outputting device 4b, a camera 7b, and an AP 8b, which are pieces of peripheral equipment, by wireless or wired connection. The connection between the second information processing device 10b and the pieces of peripheral equipment in the home of the user B may be same as the connection between the first information processing device 10a and the pieces of peripheral equipment in the home of the user A. In the embodiment, the second information processing device 10b may be a game device that executes a game. In the following description, where the first information processing device 10a and the second information processing device 10b are not specifically distinguished from each other, each of them is sometimes referred to simply as an "information processing device 10."

Figure 2:
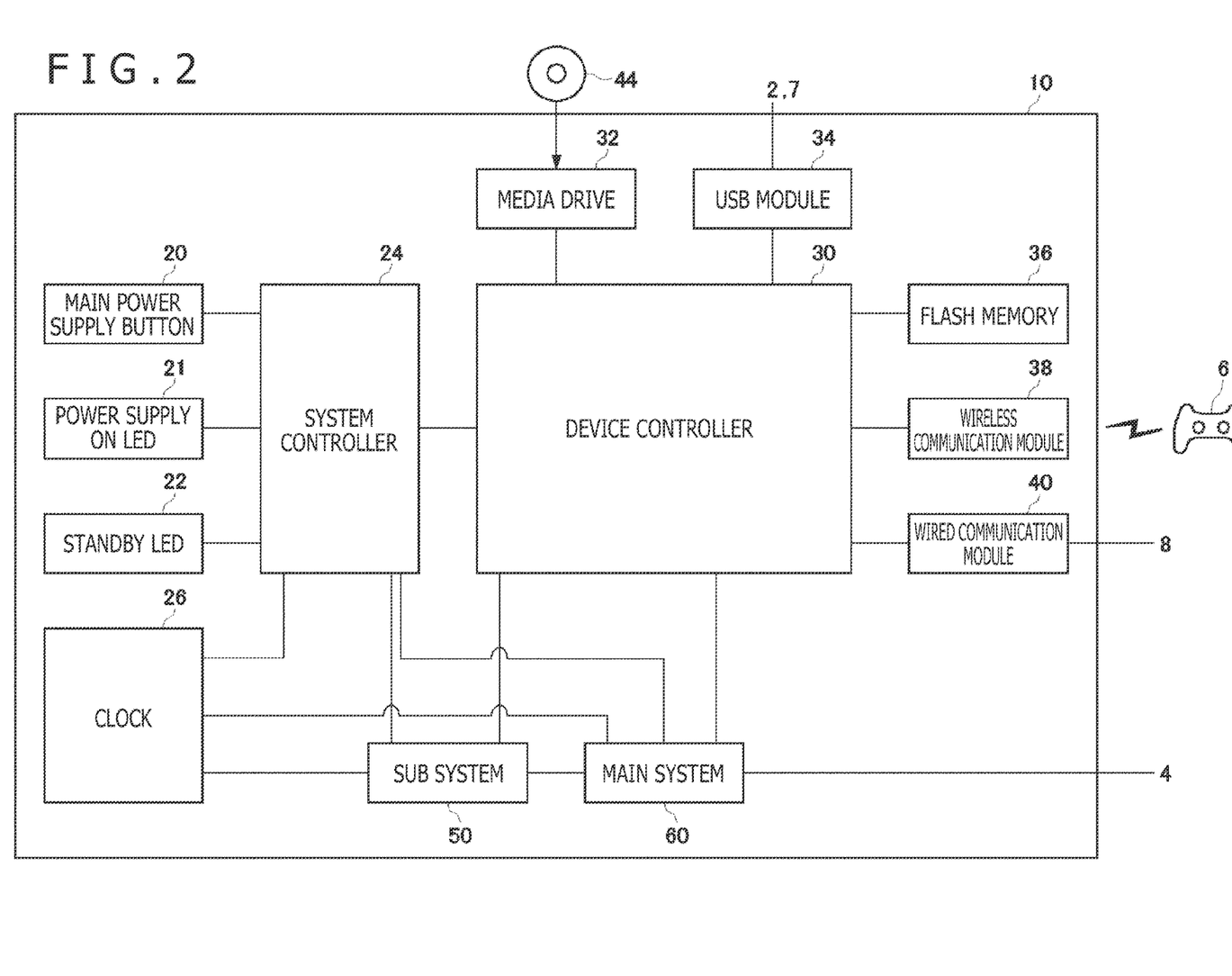
FIG. 2 is a view depicting a hardware configuration of an information processing device.

FIG. 2 depicts a hardware configuration of the information processing device 10. The information processing device 10 includes a main power supply button 20, a power supply ON LED (Light-Emitting Diode) 21, a standby LED 22, a system controller 24, a clock 26, a device controller 30, a media drive 32, a USB module 34, a flash memory 36, a wireless communication module 38, a wired communication module 40, a sub system 50, and a main system 60.

The main system 60 includes a main CPU (Central Processing Unit), a memory and a memory controller that are a main storage device, a GPU (Graphics Processing Unit) and so forth. The GPU is used principally for arithmetic operation processing of a game program. The functions may be configured as a system on-chip and may be formed on a single chip. The main CPU has a function of executing a game program recorded in an auxiliary storage device 2 or a ROM medium 44.

The sub system 50 includes a sub CPU, a memory and a memory controller that are a main storage device, and so forth but does not include a GPU nor has a function of executing a game program. The number of circuit gates of the sub CPU is smaller than the number of circuit gates of the main CPU, and the operation power consumption of the sub CPU is lower than the operation power consumption of the main CPU.

The main power supply button 20 is an inputting unit to which operation inputting is performed by a user, is provided on a front face of a housing of the information processing device 10, and is operated in order to switch on or off the power supply to the main system 60 of the information processing device 10. The power supply ON LED 21 is turned on when the main power supply button 20 is switched on, and the standby LED 22 is turned on when the main power supply button 20 is switched off.

The system controller 24 detects depression of the main power supply button 20 by the user. If the main power supply button 20 is depressed when the main power supply is in an off state, then the system controller 24 acquires the depression operation as an "on instruction." However, if the main power supply button 20 is depressed when the main power supply is in an on state, then the system controller 24 acquires the depression operation as an "off instruction."

The clock 26 is a real time clock, and generates and supplies current date and time information to the system controller 24, the sub system 50, and the main system 60. The device controller 30 is configured as an LSI (Large-Scale Integrated Circuit) that executes transfer of information between devices like a south bridge. As depicted in FIG. 2, to the device controller 30, such devices as the system controller 24, the media drive 32, the USB module 34, the flash memory 36, the wireless communication module 38, the wired communication module 40, the sub system 50, the main system 60 and so forth are connected. The device controller 30 absorbs a difference in electric characteristic and a difference in data transfer speed between the devices to control the timing of data transfer.

The media drive 32 is a drive device that attaches and drives a ROM medium 44 in which application software of a game and so forth and license information are recorded to read out a program, data and so forth from the ROM medium 44. The ROM medium 44 may be a read-only recording medium such as an optical disk, a magneto-optical disk, or a blue ray disk.

The USB module 34 is a module that connects to an external equipment by a USB cable. The USB module 34 may connect to the auxiliary storage device 2 and a camera 7 by a USB cable. The flash memory 36 is an auxiliary storage device that configures an internal storage. The wireless communication module 38 communicates, for example, with the inputting device 6 by wireless communication by using a communication protocol such as the Bluetooth (registered trademark) protocol or the IEEE (Institute of Electrical and Electronics Engineers) 802.11 protocol. The wired communication module 40 communicates with an external equipment by wired communication and connects to a network 3 through an AP 8.

In the embodiment, the users A and B would meet at the home of the user A and play a game together while watching a game screen image displayed on the outputting device 4a. The outputting device 4a displays the game screen image for the user A and the game screen image for the user B in regions different from each other. The information processing system 1 provides a contrivance that allows the users A and B to share the single outputting device 4a even if they do not play a single game in the local multi-play mode. This implements such an environment that the plurality of players A and B feel as if a game were being carried out together on the one first information processing device 10a.

The first information processing device 10a executes a first application on the basis of operation information of the inputting device 6a by the user A, and the second information processing device 10b executes a second application on the basis of operation information of the inputting device 6b by the user B. The first information processing device 10a in the home of the user A is connected by P2P connection to the second information processing device 10b through the network 3, and the user B transmits operation information of the inputting device 6b from the first information processing device 10a to the second information processing device 10b. A mode in which the user B transmits operation information to the second information processing device 10b from a remote place to play a game is referred to as "remote play." The user B can receive provision of a remote play service by signing in to the management server 5.

Figure 3:
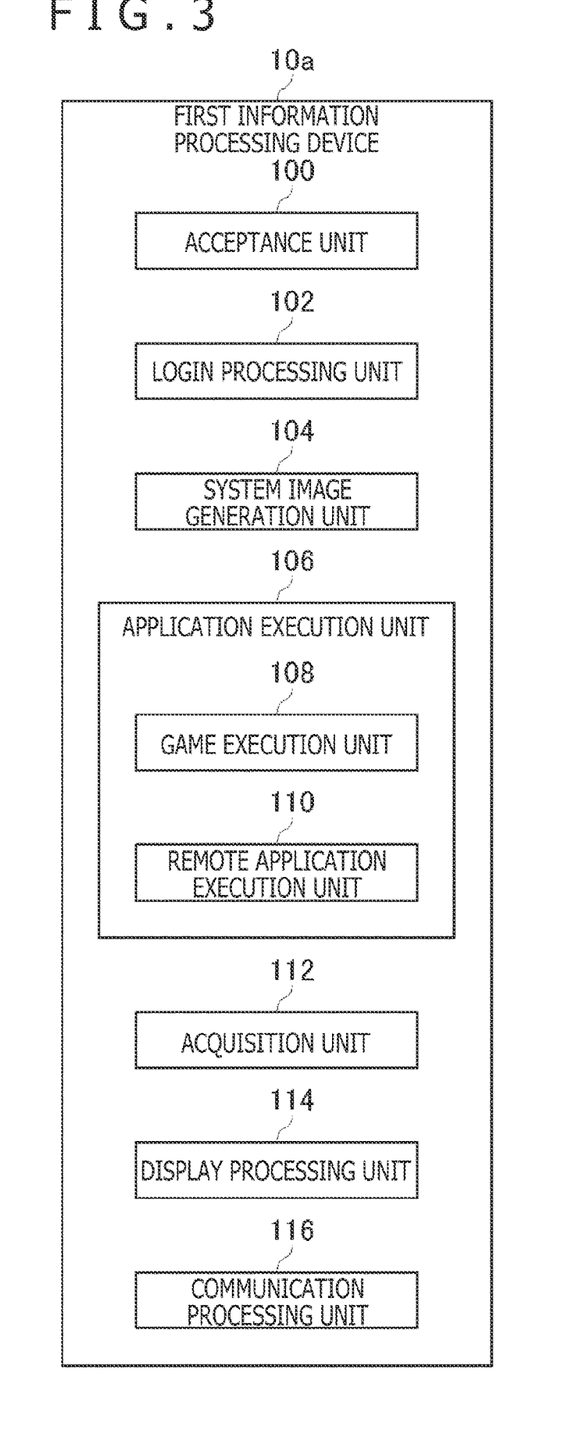
FIG. 3 is a view depicting functional blocks of a first information processing device.

FIG. 3 depicts functional blocks of the first information processing device 10a. The first information processing device 10a includes an acceptance unit 100, a login processing unit 102, a system image generation unit 104, an application execution unit 106, an acquisition unit 112, a display processing unit 114, and a communication processing unit 116. The application execution unit 106 has a function of executing a plurality of applications at the same time, and includes, in the embodiment, a game execution unit 108 for executing a game and a remote application execution unit 110 for executing an application for implementing a remote play (such application is hereinafter referred to as a "remote application"). The communication processing unit 116 has a function of the wireless communication module 38 and the wired communication module 40 depicted in FIG. 2.

The elements indicated as the functional blocks that perform various processes in FIG. 3 can be configured, in hardware, from a circuit block, a memory, and other LSIs and can be implemented, in software, by a program loaded in the memory. Accordingly, it is recognized by those skilled in the art that such functional blocks as described above can be implemented in various forms only from hardware, only from software, or from a combination of hardware and software and is not restricted to any one of them.

If the first information processing device 10a is activated, then the login processing unit 102 generates a login screen image. In the embodiment, the user B first operates the inputting device 6b on the login screen image displayed on the outputting device 4a to log in to the first information processing device 10a. If the user B has once registered information for login (a login name, a passcode or the like) into the first information processing device 10a, then the login processing unit 102 allows the user B to log in thereto on the basis of the login information inputted thereto. If the login information has not been registered once, then the login processing unit 102 allows the user B to register information for login newly and then log in thereto. It is to be noted that, if the login processing unit 102 has incorporated therein a contrivance for allowing, even if login information is not registered, a user to temporarily log in as a guest user thereto, then the user B may log in as a guest user utilizing the contrivance.

Figure 4:
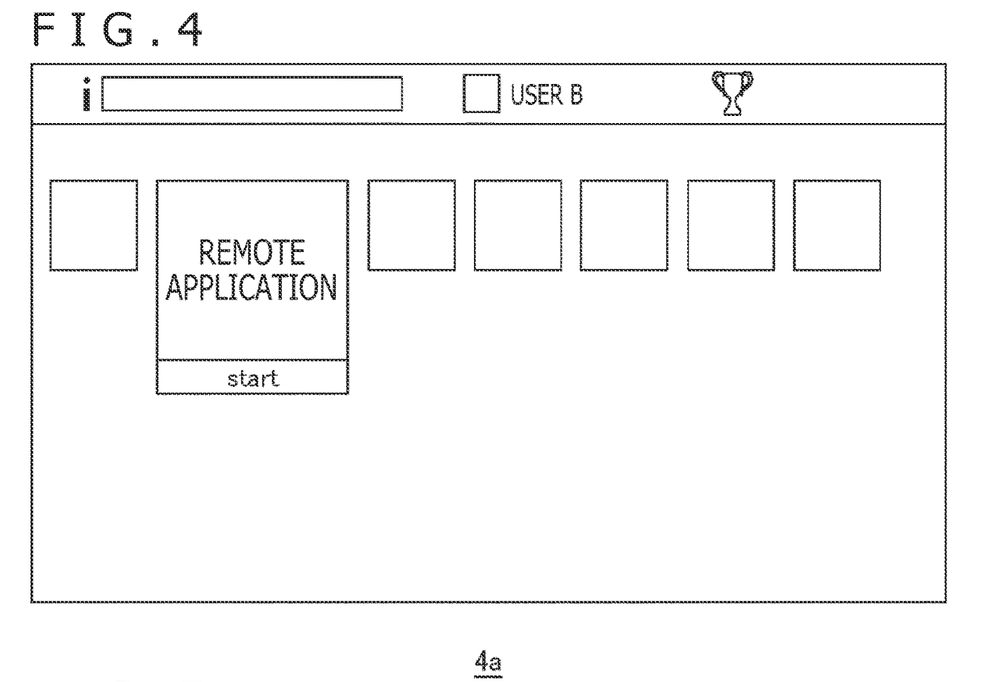
FIG. 4 is a view depicting an example of a home screen image.

FIG. 4 depicts an example of a home screen image when the user B logs in to the first information processing device 10a. If the user B logs in from the login screen image, then the system image generation unit 104 generates a home screen image for the user B. The user B selects an icon of the remote application on the home screen image to activate the remote application. The remote application execution unit 110 executes the remote application to provide a setting screen image for allowing the user B to carry out a remote play.

If the user B inputs information for identifying the second information processing device 10b, which is made a connection destination, on the remote play setting screen image, then the communication processing unit 116 transmits a connection request to the second information processing device 10b. At this time, if the main power supply to the second information processing device 10b is in an off state, then the main system 60 of the second information processing device 10b is activated on the basis of the connection request. The first information processing device 10a and the second information processing device 10b are connected to each other by P2P communication and form an environment in which a remote play can be carried out. The main system 60 generates menu image data in which game icons installed in the auxiliary storage device 2b are arrayed and transmits the menu image data to the first information processing device 10a, and the display processing unit 114 displays a menu screen image on the outputting device 4a.

If the user B selects a desired game icon on the menu screen image, then the acceptance unit 100 receives the selection information, and the remote application transmits the selection information from the communication processing unit 116 to the second information processing device 10b. Here, it is assumed that the user B selects an FPS (First Person Shooter) game entitled "combat field." The second information processing device 10b activates the selected "combat field" and generates and transmits start screen image data to the first information processing device 10a. It is to be noted that, although the second information processing device 10b also generates game sound simultaneously and transmits the game sound to the first information processing device 10a, for the convenience of description, description is given only of the image while description of the game sound is omitted. When the game image data is transmitted from the second information processing device 10b, the display processing unit 114 displays a game screen image over an overall area of the outputting device 4a in place of the menu screen image.

In the remote play by the user B, the acceptance unit 100 accepts operation information inputted to the inputting device 6b by the user B, and the communication processing unit 116 transmits the operation information of the inputting device 6b by the user B to the second information processing device 10b. A game (combat field) activated in the second information processing device 10b treats the operation information transmitted thereto as an input to the game, and generates and transmits game image data on which the operation of the user B is reflected to the first information processing device 10a. In the first information processing device 10a, the acquisition unit 112 acquires the game image data on which the operation information of the inputting device 6b is reflected, and the display processing unit 114 displays a game screen image on the outputting device 4a.

Figure 5:
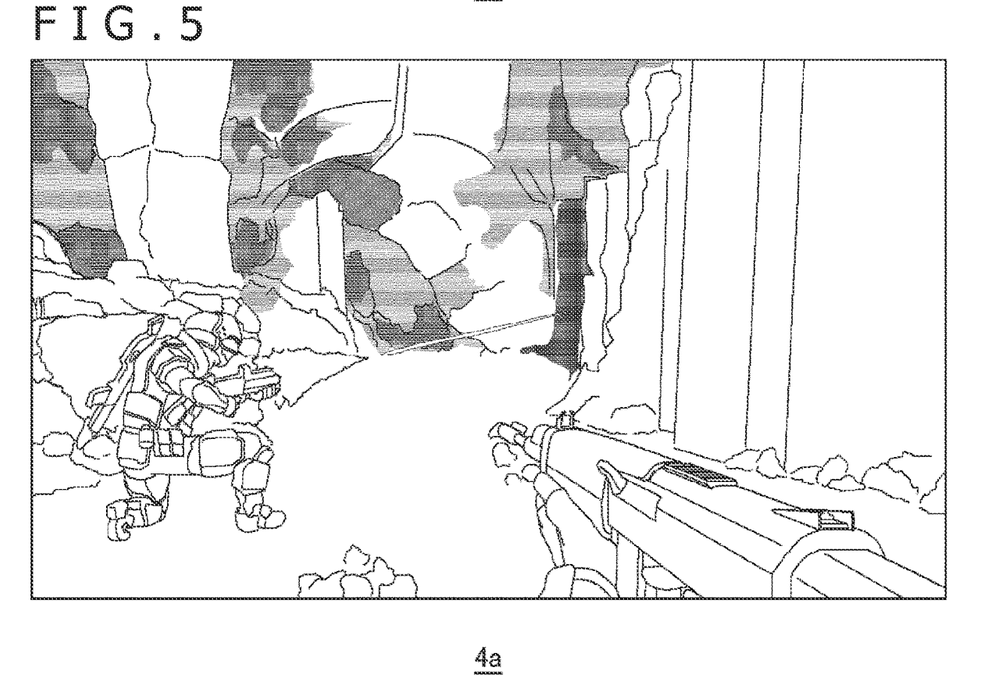
FIG. 5 is a view depicting an example of a game screen image.

FIG. 5 depicts an example of a game screen image being played by the user B. This game screen image indicates a battle scene in the "combat field." The user B can remotely operate the second information processing device 10b while staying at the place spaced away from the second information processing device 10b to play a game installed in the second information processing device 10b.

If the user A operates a predetermined button of the inputting device 6a during the remote play by the user B, then the login processing unit 102 generates a login screen image, and the display processing unit 114 displays the login screen image over an overall area of the outputting device 4a. Since the first information processing device 10a is a game console that is usually used by the user A, it has login information of the user A registered therein, and the login processing unit 102 allows the user A to log in thereto on the basis of the login information inputted from the user A on the login screen image. It is to be noted that, if the display processing unit 114 displays the login screen image over the overall area of the outputting device 4a, then the game screen image of the game being remotely played by the user B is hidden by the login screen image and disappears.

Figure 6:
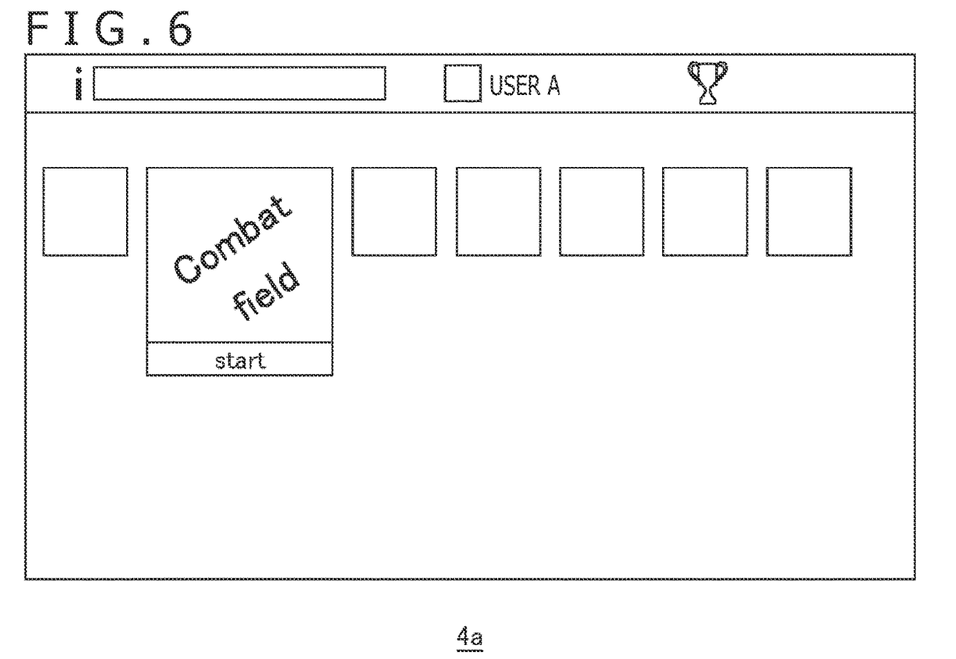
FIG. 6 is a view depicting another example of a home screen image.

FIG. 6 depicts an example of a home screen image when the user A logs in to the first information processing device 10a. If the user A logs in from the login screen image, then the system image generation unit 104 generates a home screen image for the user A. At this time, if the user A operates (for example, by long press) a predetermined button of the inputting device 6a, then the system image generation unit 104 generates menu screen image data and the display processing unit 114 displays the menu screen image on a superposed relation on the home screen image.

Figure 7:
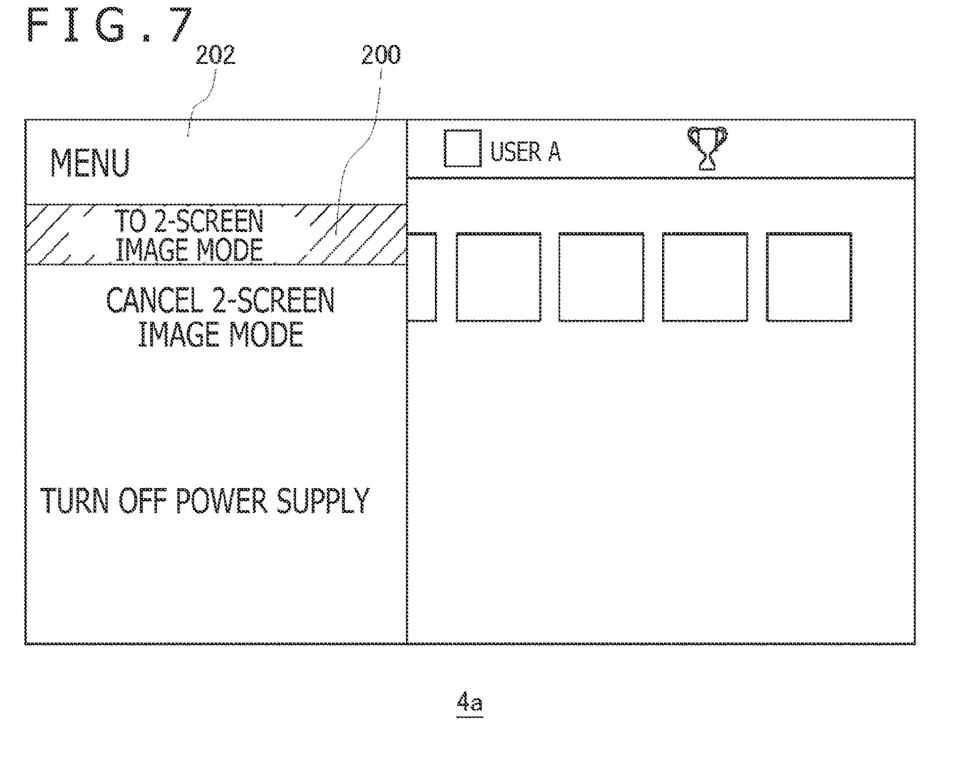
FIG. 7 is a view depicting an example of a menu screen image displayed in a superposed relation on a home screen image.

FIG. 7 depicts an example of a menu screen image on which a home screen image is displayed in a superposed relation. When not the user A but the user B is carrying out a remote play, the system image generation unit 104 generates menu image data including at least an item "To 2-screen image mode," and the display processing unit 114 displays a menu screen image 202. A focus frame 200 is arranged on the menu screen image 202, and the user A can operate the inputting device 6a to move the position of the focus frame 200. If the user A depresses a determination button of the inputting device 6a with the focus frame 200 adjusted to "To 2-screen image mode," then the display processing unit 114 sets a first region and a second region on the display image of the outputting device 4a.

Figure 8:
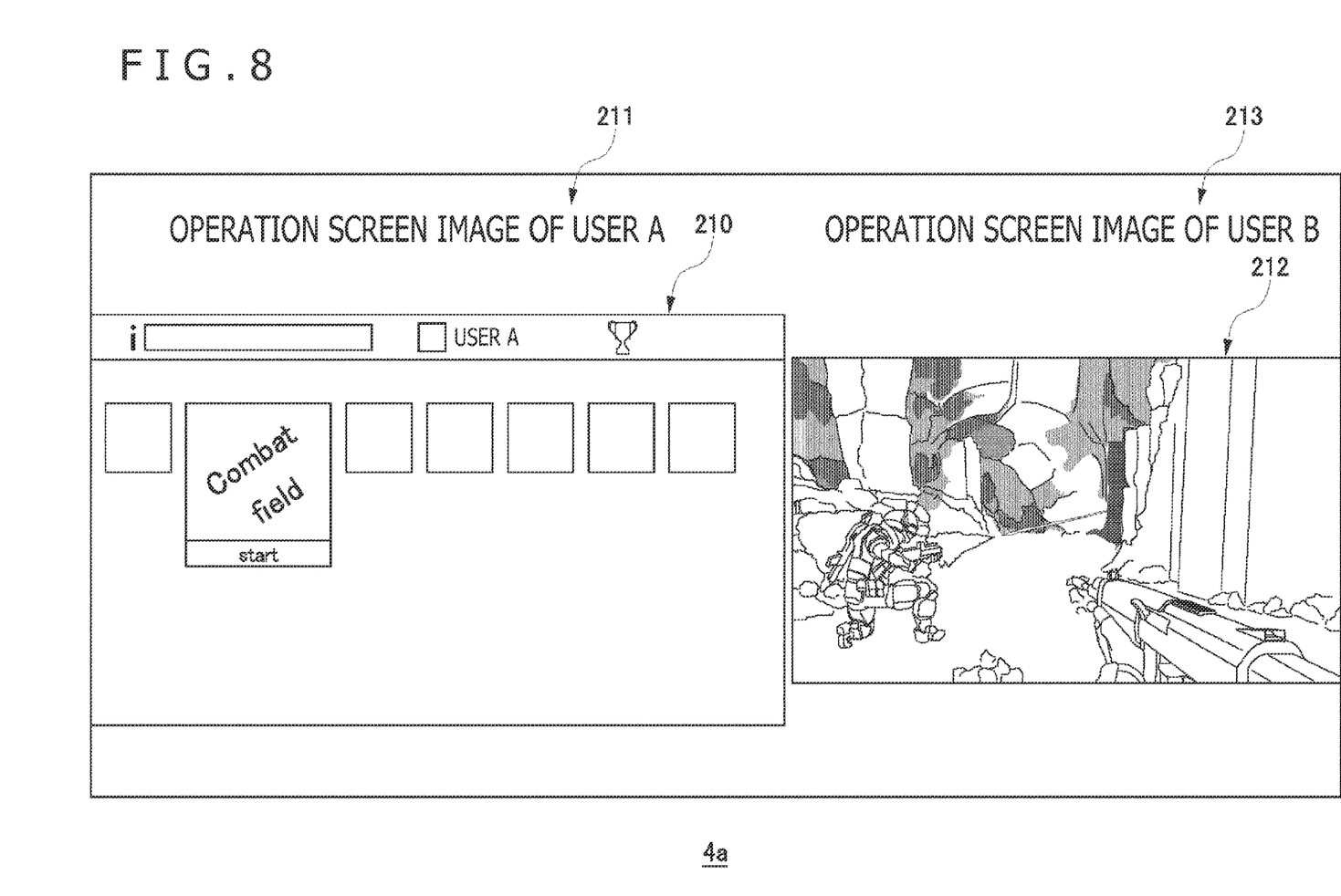
FIG. 8 is a view depicting a first region and a second region set to a display image.

FIG. 8 depicts a first region 210 and a second region 212 set to the display of the outputting device 4a. The display processing unit 114 allocates the first region 210 to the user A and allocates the second region 212 to the user B. Although the first region 210 and the second region 212 may be equal in size, the first region 210 to be allocated to the user A who is an owner user of the first information processing device 10a may otherwise be set greater. If the user A selects the 2-screen image mode on the menu screen, then a game screen image that is operated by the user B is displayed in the second region 212. Consequently, the user B is enabled to operate the inputting device 6b to resume the play of the "combat field."

The display processing unit 114 displays operation user information 211, which indicates that the first region 210 is a region allocated to the user A, in the proximity of the first region 210, and displays operation user information 213, which indicates that the second region 212 is a region allocated to the user B, in the proximity of the second region 212. Consequently, the users A and B can easily recognize the regions individually allocated to themselves.

The user A selects a desired game icon from within the home screen image. If the user A selects the "combat field," then the game execution unit 108 activates the "combat field" and generates activation screen image data, and the display processing unit 114 displays the activation screen image of the "combat field" on the first region 210.

In the game play by the user A, the acceptance unit 100 accepts operation information inputted to the inputting device 6a by the user A. The game execution unit 108 executes the "combat field" on the basis of the operation information of the inputting device 6a by the user A and generates and supplies game image data to the display processing unit 114. The display processing unit 114 displays a game screen image on the first region 210.

Figure 9:
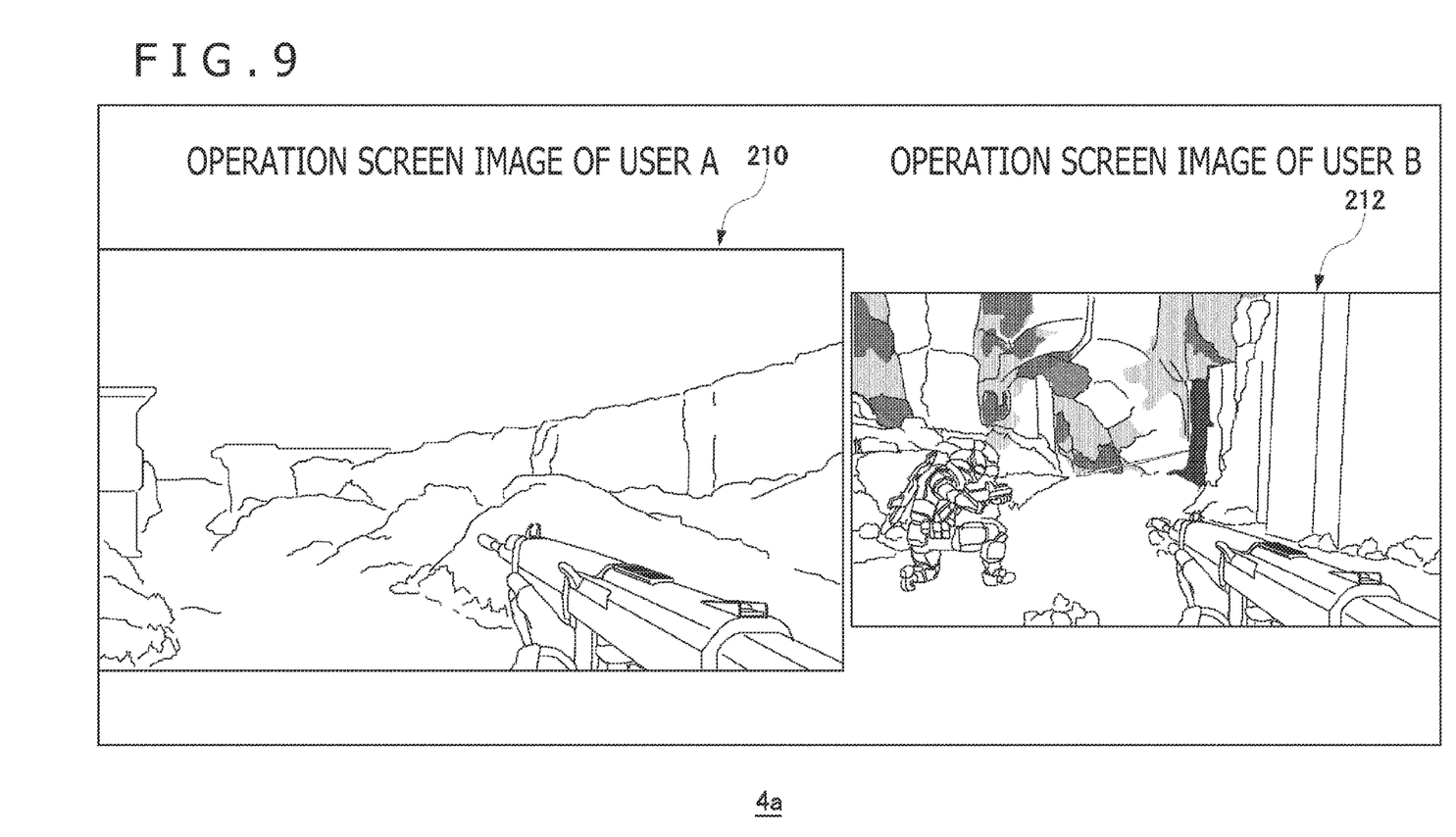
FIG. 9 is a view depicting an example of two game screen images.

FIG. 9 depicts an example of two game screen images. The display processing unit 114 displays a game screen image of the combat field played by the user A in the first region 210 and displays a game screen image of the combat field played by the user B in the second region 212. Where the user B participates in an online game session and is playing a game together with other players, the user A may participate in the game session. In this manner, the information processing system 1 of the embodiment provides an environment that makes it possible for two users A and B to play even a game, which does not have a local multi-play mode, together by participating in the same game session utilizing the remote play contrivance.

The present invention has been described on the basis of the embodiment. This embodiment is exemplary, and it is recognized by those skilled in the art that various modifications are possible in regard to the combinations of the components, processes and so forth of the embodiment and that also such modifications fall within the scope of the present invention. Although, in the embodiment, the users A and B play the same game title, it is also possible for them to play game titles different from each other. Further, although the embodiment has been described taking a game as an example of an application, another type of an application may be applied.

It is to be noted that, if the user A ends the remote play by the user B, then the user B is logged out from the first information processing device 10a and the 2-screen image mode display is ended. It is to be noted that, if the power supply to the second information processing device 10b is turned off by the user B, then the remote play may be ended compulsorily to end display of the 2-screen image mode.

INDUSTRIAL APPLICABILITY

The present invention can be utilized to a technical field in which a screen image of an application is displayed.

REFERENCE SIGNS LIST

1: Information processing system
6a, 6b: Inputting device
10a: First information processing device
10b: Second information processing device
100: Acceptance unit
102: Login processing unit
104: System image generation unit
106: Application execution unit
108: Game execution unit
110: Remote application execution unit
112: Acquisition unit
114: Display processing unit
116: Communication processing unit

The invention claimed is:

1. An information processing device comprising:
an application execution unit that executes a first application on a basis of operation information of a first inputting device by a first user to generate image data of the first application;
a communication processing unit that receives operation information of a second inputting device by a second user and transmits such operation information over a data network to another information processing device of the second user located remotely from the information processing device of the first user;
an acquisition unit that acquires image data of a second application from the another information processing device, the operation information of the second inputting device being reflected on the image data of the second application resulting from execution of the second application on the another information processing device; and
a display processing unit that displays a screen image of the first application and a screen image of the second application on a same display device,
wherein the receiving the operation information of the second inputting device, the transmitting such operation information to the another information processing device, and the acquiring image data of the second application occur prior to displaying the screen image to either of the first user or the second user.

2. The information processing device according to claim 1, wherein the display processing unit displays the screen image of the first application in a first region of the display device and displays the screen image of the second application in a second region of the display device.

3. The information processing device according to claim 2, wherein the display processing unit displays information indicating that the second region is a region allocated to the second user.

4. The information processing device according to claim 1, wherein the first user and the second user log in to the information processing device.

5. An information processing system comprising:
a first information processing device that executes a first application on a basis of operation information of a first inputting device by a first user to generate image data of the first application; and
a second information processing device that executes a second application on a basis of operation information of a second inputting device by a second user, where the operation information of the second inputting device is received at the first information processing device, transmitted over a data network to the second information processing device of the second user located remotely from the first information processing device, and where the first information processing device acquires image data of the second application from the second information processing device resulting from the operation information of the second inputting device being employed in the execution of the second application,
wherein the first information processing device displays a screen image of the first application in a first region of a display device and displays a screen image of the second application in a second region of the display device,
wherein the receiving the operation information of the second inputting device, the transmitting such operation information to the second information processing device, and the acquiring image data of the second application occur prior to displaying the screen image to either of the first user or the second user.

6. The information processing system according to claim 5, wherein the first application and the second application are the same application, and the first user and the second user are able to participate in the same game session.

7. An application screen image displaying method comprising:
executing a first application on a first information processing device on a basis of operation information of a first inputting device by a first user to generate image data of the first application;
receiving operation information of a second inputting device by a second user;
transmitting the operation information of the second inputting device by the second user over a data network to a second information processing device of the second user located remotely from the first information processing device of the first user;
acquiring image data of a second application from the second information processing device, the operation information of the second inputting device being reflected on the image data of the second application resulting from execution of the second application on the second information processing device; and
displaying a screen image of the first application and a screen image of the second application on a same display device,
wherein the receiving the operation information of the second inputting device, the transmitting such operation information to the second information processing device, and the acquiring image data of the second application occur prior to displaying the screen image to either of the first user or the second user.

8. A non-transitory, computer readable storage medium containing a program, which when executed by a computer, causes the computer to perform an application screen image displaying method by carrying out actions, comprising:
executing a first application on a first information processing device on a basis of operation information of a first inputting device by a first user to generate image data of the first application;
receiving operation information of a second inputting device by a second user;
transmitting the operation information of the second inputting device by the second user over a data network to a second information processing device of the second user located remotely from the first information processing device of the first user;
acquiring image data of a second application from the second information processing device, the operation information of the second inputting device being reflected on the image data of the second application resulting from execution of the second application on the second information processing device; and
displaying a screen image of the first application and a screen image of the second application on a same display device,
wherein the receiving the operation information of the second inputting device, the transmitting such operation information to the second information processing device, and the acquiring image data of the second application occur prior to displaying the screen image to either of the first user or the second user.

* * * * *